Nov. 10, 1959  A. E. WETHERBEE, JR  2,911,912
ROLL CONTROL MEANS

Filed June 27, 1957  2 Sheets-Sheet 1

INVENTOR
ARTHUR E. WETHERBEE JR.
BY Leonard F. Wessling
ATTORNEY

Nov. 10, 1959  A. E. WETHERBEE, JR  2,911,912
ROLL CONTROL MEANS
Filed June 27, 1957  2 Sheets-Sheet 2
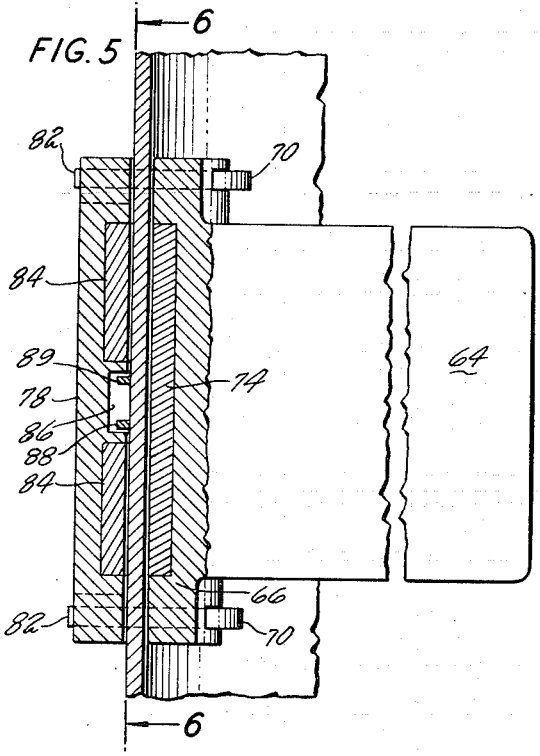
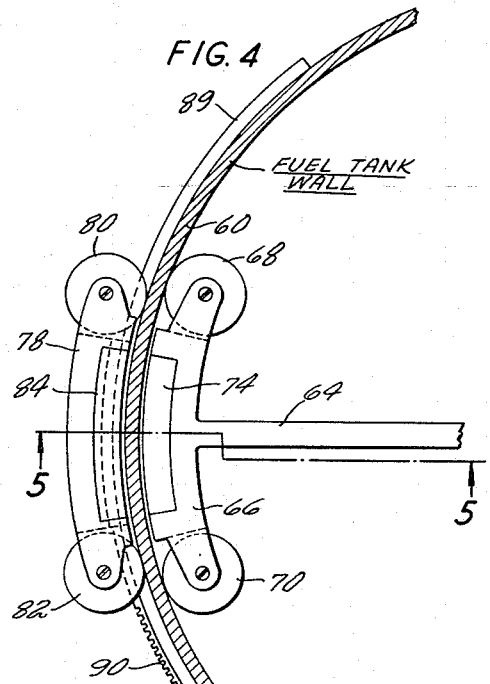
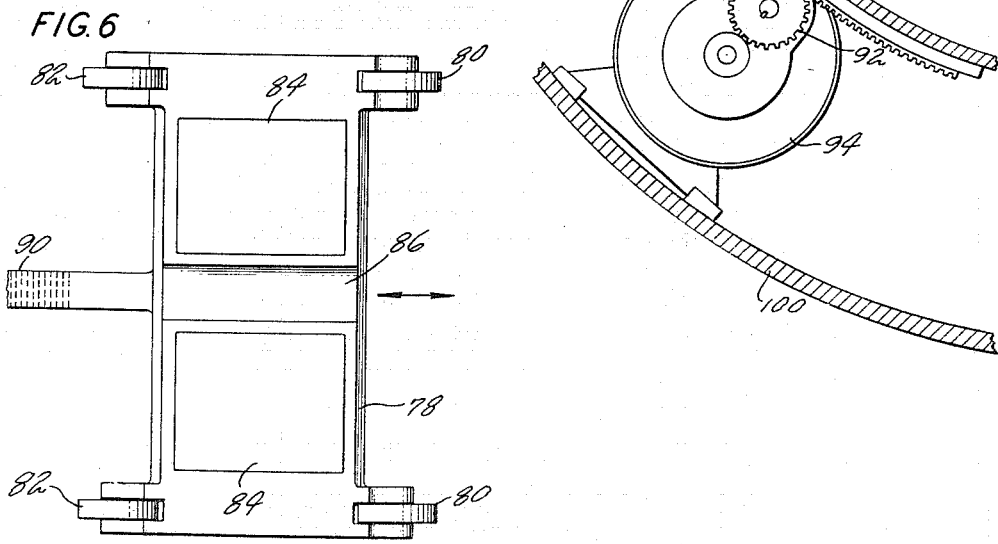
INVENTOR
ARTHUR E. WETHERBEE JR.
BY
ATTORNEY 2,911,912
Patented Nov. 10, 1959

2,911,912
ROLL CONTROL MEANS

Arthur E. Wetherbee, Jr., Newington, Conn., assignor to United Aircraft Corporation, East Hartford, Conn., a corporation of Delaware Application June 27, 1957, Serial No. 668,480

4 Claims. (Cl. 102—50)

This invention relates to control mechanisms and more particularly to control mechanisms for vehicles which are subject to deviation from a given attitude.

It is an object of this invention to provide a control mechanism for a vehicle which is subject to deviation from a predetermined attitude such as the rolling motion of a missile or even the rolling motion of a ship.

It is a further object of this invention to provide a control means of the type described which utilizes the reaction forces which can be generated by a relatively large mass which normally does not quickly respond to motions of the vehicle itself.

It is a still further object of this invention to utilize the mass of the fuel itself in a vehicle such as a rocket powered missile where the fuel comprises a substantial portion of the mass of the entire vehicle.

It is a primary object of this invention to utilize the reaction obtainable from a body of fuel whose inertia is not readily overcome by the rolling motion of a missile under conditions when the external aerodynamic surfaces of the missile are not very effective.

These and other objects of this invention will become readily apparent from the following detailed description of the drawings in which:

Fig. 4 is an enlarged partially sectioned view of a modified form of the invention;

Fig. 5 is a cross-sectional illustration taken along the line 5—5 of Fig. 4; and Fig. 6 is another view of the carriage shown in Figs. 4 and 5.

According to this invention use is made of the fact that in missiles or other aircraft the propellants or fuels which drive these vehicles comprise a majority of the mass of the vehicle at launching. Furthermore, such fuels have low viscosity and therefore do not readily follow the rotational motion of their containers. Thus, for example, a cylindrical container of such liquid fuels can be rotated through several revolutions before the liquid contents are put into motion by the viscous forces. The propellant in a rocket can therefore be used as an independent mass against which rolling forces can be produced. Where other than liquid fuels are utilized it would be possible to mount the fuel source in such a manner that it would not readily follow the rolling motion of the vehicle body itself and thus provide a mass against which a reaction force can be produced.

Figure 1:
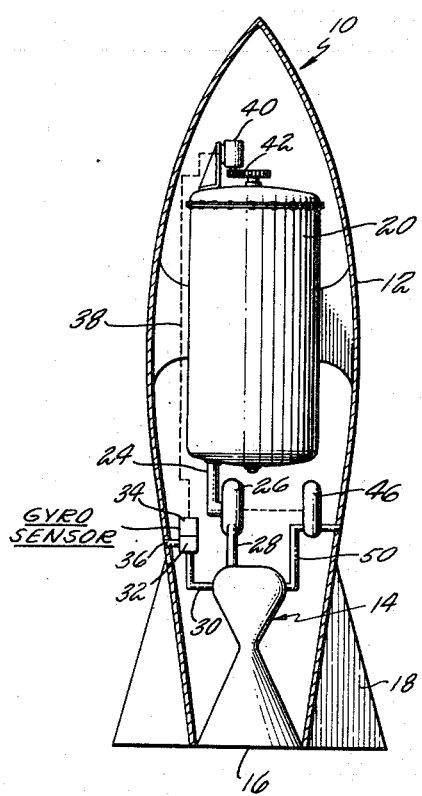
Fig. 1 is a schematic illustration of a missile including the elements of this invention.

Referring to Fig. 1 a missile is generally indicated at 10 as having a main body 12 including a rocket type power plant 14 and an exhaust nozzle 16. The body 12 may include one or more external aerodynamic control surfaces 18 which may be utilized to control the directional movements of the vehicle. At low forward speeds and in rarefied atmosphere the aerodynamic surfaces 18 may not be as effective as required to overcome any external forces which tend to cause a rolling motion of the vehicle about its longitudinal axis or to produce motion for directional control. The body 12 includes a relatively large fuel tank 20 which when full of liquid fuel comprises a majority of the mass of the entire vehicle. Fuel from the tank 20 may be withdrawn via a line 24 via pump 26 which injects it into the rocket power plant 14 via a main line 28. Some of the gases from the rocket chamber may be led by line 30 through a suitable turbine 32 for driving a gyroscope 34. The exhaust from the turbine 32 may then be further directed overboard via the line 36. The gyro 34 may sense the rolling motion of the vehicle about its longitudinal axis and by a suitable connection 38 may control a motor 40. The gyro may produce corrective control forces or if desired directional changes may be made in the vehicle by any suitable signal. The control of the motor 40 may be by suitable on-off reversible switch or by a potentiometer which may send a signal of reverse polarity to the motor 40 so as to drive the gears 42.

The fuel pump 26 may be driven by a suitable turbine motor 46 which in turn is powered by rocket chamber gases passing through line 50.

Figure 2:
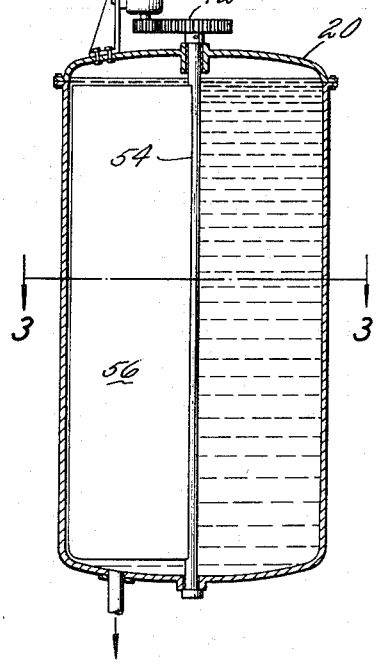
Fig. 2 is an enlarged view of the fuel tank including the reaction member immersed therein.
Figure 3:
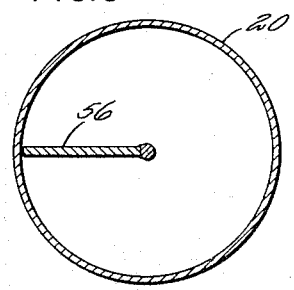
Fig. 3 is a cross-sectional illustration taken along the line 3—3 of Fig. 2.

As better seen in Figs. 2 and 3 the gears 42 are connected to a vertical shaft 54 which has fixed thereto a paddle-like member 56 of relatively large area. The paddle-like member 56 is immersed in the fuel in the tank 20. The fuel tank for balancing purposes is normally situated so that it and its contents are symmetrical with respect to the longitudinal axis of the vehicle.

Should any rolling movements be sensed by the gyro 34 (Fig. 1), the motor 40 through the gears 42 can rotate the member 56 in the fuel tank 20. The paddle-like member 56 is rotated usually in the same direction as the rolling movement of the vehicle so that a reaction force is then transmitted back through the shaft 54, gears 42 and the motor 40 and to the tank 20. Any number of paddles may be used. With the tank 20 being fixed to the body 12 of the vehicle 10 this reaction force is transmitted to the body so as to oppose the rolling movement of the vehicle which movement may be a deviation from the desired in-space position of the vehicle.

It of course should be realized that the primary purpose of the invention is to provide some mass which has relatively free motion with respect to the vehicle body. In other words a solid propellant body may be used by mounting it for free relative motion about the body axis; as for example, the longitudinal axis for roll control. Furthermore, a liquid fuel tank may have one or more fixed paddles with means for rotating the tank about an axis relative to the body.

It may be desirable to avoid the necessity of seals where mechanisms must pass through the walls of the fuel tank. To avoid this, this invention may take the form generally illustrated in Figs. 4 through 6. As seen herein, the wall of the fuel tank may be indicated at 60. Within this tank there may be disposed a paddle-like member 64 which is carried by a carriage 66. The carriage 66 includes rollers 68 and 70 to provide frictionless motion of the carriage. About the longitudinal axis of the tank the carriage 66 may carry a strong permanent magnet 74. On the outside of the tank wall there is provided a second carriage 78 also mounted on rollers 80 and 82 and carrying a cooperating permanent magnet 84. The carriage 78 includes a trough 86 which engages a pair of spaced guide members 88 and 89. The carriage 78 also includes a geared rack 90 which may be driven by a pinion gear 92. The pinion gear 92 may be driven in turn by a suitable electric motor 94 which can be controlled in a manner similar to that described in connection with Figs. 1 and 2. Rotation of the pinion gear 92 will move the rack 90 about the outer periphery of the wall 60 of the tank and along the guide members 88 and 89 so that any new position of the carriage 78 will be reflected in a corresponding new position of the carriage 66. The guide members 88 and 89 are spaced apart to provide room for movement of the geared rack 90 therebetween.

In this manner the paddle 64 can be moved to obtain a reaction force back through the carriages 66 and 78 and through the rack 90, pinion 92, motor 94 and then the outer casing or body 100 of the vehicle which is being controlled. In this manner the reactive force is coupled from the power to the members outside of the tank through the magnetic field by the permanent magnets 74 and 84.

In summary, the gist of this invention can be described as follows:

This device is based upon the principle of mechanics that for every action there is an equal and opposite reaction. Consider two masses of hollow cylindrical form which are concentric along their axis, one being contained within the other. Assume that one can be driven in rotation by mechanical means which is secured to the other. If this means is actuated, the rotational force applied to one cylinder is felt as an equal and opposite rotational force on the other cylinder.

For a given relative rotation of the two cylinders, the absolute rotation of each cylinder will depend upon the relative masses of the cylinders and/or other restraints which may be placed on them.

If the mechanical means between the cylinders is not actuated, then the two cylinders are effectively locked together and will respond to external (or internal) forces as though they were one single mass.

For the case of a missile in free flight, the external forces wold be principally aerodynamic. If the inner cylinder (representing a fuel tank) is driven in rotation relative to and from the outer, the outer cylinder (missile shell) will tend to rotate in the opposite direction. The absolute rotation will depend upon:

(a) relative inertia of the two components
(b) aerodynamic forces on the external cylinder (shell and fins)

It is possible for relative rotation to take place while the whole assembly is rotating, but for our purposes it is easiest to think of a normal situation where roll is limited only to aerodynamic disturbances which are to be compensated for, or to rolling as necessary for maneuvering purposes.

When rotatable paddles are used in a fuel tank, the effect is to convert the liquid fuel, which normally has little rotative inertia, into what is effectively a solid body. In this case, the missile shell and the tank wall together form the outer cylinder and the fuel forms the inner cylinder. When the paddles are not being driven, the whole missile acts like a single body, and for dynamic purposes the fuel can be considered a solid part of the whole. Because of this, a missile with paddles installed will have more inertia in roll than one without paddles, and will actually have more resistance to incidental external rolling forces.

Although only two embodiments of this invention have been illustrated and described herein, it will become apparent that various changes and modifications may be made in the construction and arrangement of the various parts without departing from the scope of this novel concept.

What it is desired by Letters Patent is:

1. In a flight vehicle having a main cylindrical body, said body having a longitudinal axis, a source of liquid fuel carried in said body whereby it comprises a substantial mass distributed symmetrically about said axis, said vehicle being subject to rolling motion about said axis, a paddle-like member having a relatively large flat surface immersed in said fuel, the plane of said surface including said axis, said paddle being pivoted to said body for movement about said axis, power means connected to said body for moving said member about said axis with respect to said body, and means connecting said member to said power means to oppose said rolling motion about said axis when said member is moved by said power means.

2. In a vehicle according to claim 1 wherein said last-mentioned means includes a motor and gear connection for moving said member.

3. In a vehicle according to claim 1 wherein said last-mentioned means includes a motor and magnetic means for moving said member.

4. In a flight vehicle having a body, a power plant for driving the vehicle, a substantially closed fuel container for said power plant, a fluid connection between said container and said power plant, the fuel in said container forming a substantial mass, means for sensing deviating motions of said vehicle in flight for producing a signal, an axis passing through said container, a flat paddle-like member in said container and extending through the fuel, said paddle-like member including a flat surface having a peripheral portion conforming substantially with a portion of the profile of the wall of said container, the plane of said paddle surface including said axis, means for pivoting said paddle to said body for movement about said axis so that it may react against the fuel in said container and produce a force transversely of said axis, power means connected to said body and responsive to said signal for moving said paddle about said axis with respect to said body, and means connecting said paddle to said power means to oppose said deviating motions when said paddle is moved by said power means.

References Cited in the file of this patent

UNITED STATES PATENTS

| | | |
|---|---|---|
| 1,730,941 | Myers | Oct. 8, 1929 |
| 2,077,143 | Carroll | Apr. 13, 1937 |
| 2,158,180 | Goddard | May 16, 1939 |
| 2,352,044 | Von Den Steinen | June 20, 1944 |
| 2,409,282 | Hopkins | Oct. 15, 1946 |
| 2,409,858 | Hopkins | Oct. 22, 1946 |
| 2,500,537 | Goddard | Mar. 14, 1950 |
| 2,520,433 | Robinson | Aug. 29, 1950 |
| 2,623,465 | Jasse | Dec. 30, 1952 |
| 2,694,898 | Stauff | Nov. 23, 1954 |
| 2,726,510 | Goddard | Dec. 13, 1955 |
| 2,745,095 | Stoddard | May 8, 1956 |
| 2,774,305 | Fitzgerald | Dec. 18, 1956 |

FOREIGN PATENTS

| | | |
|---|---|---|
| 625,104 | France | Apr. 19, 1927 |